R. H. McCAUGHEY.
DISK HARROW ADJUSTMENT.
APPLICATION FILED NOV. 25, 1908.
952,341.
Patented Mar. 15, 1910.
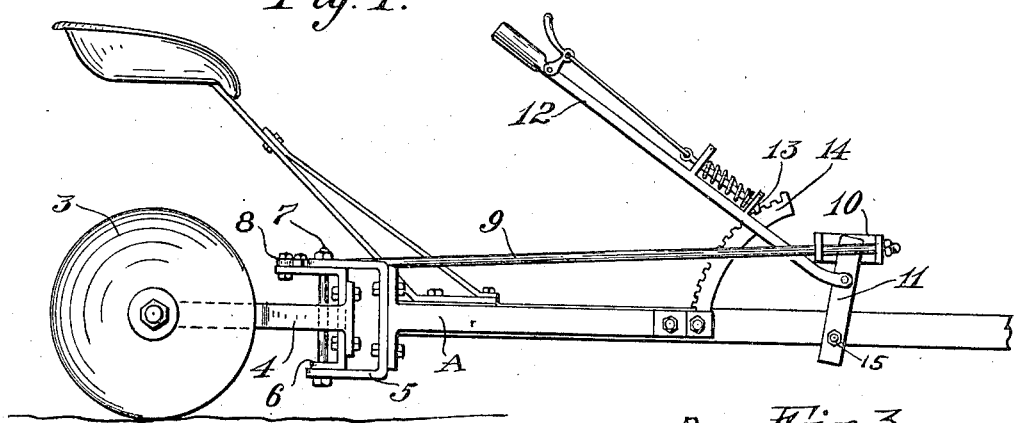
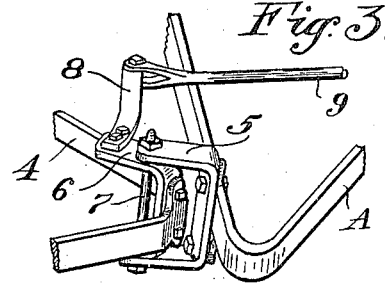
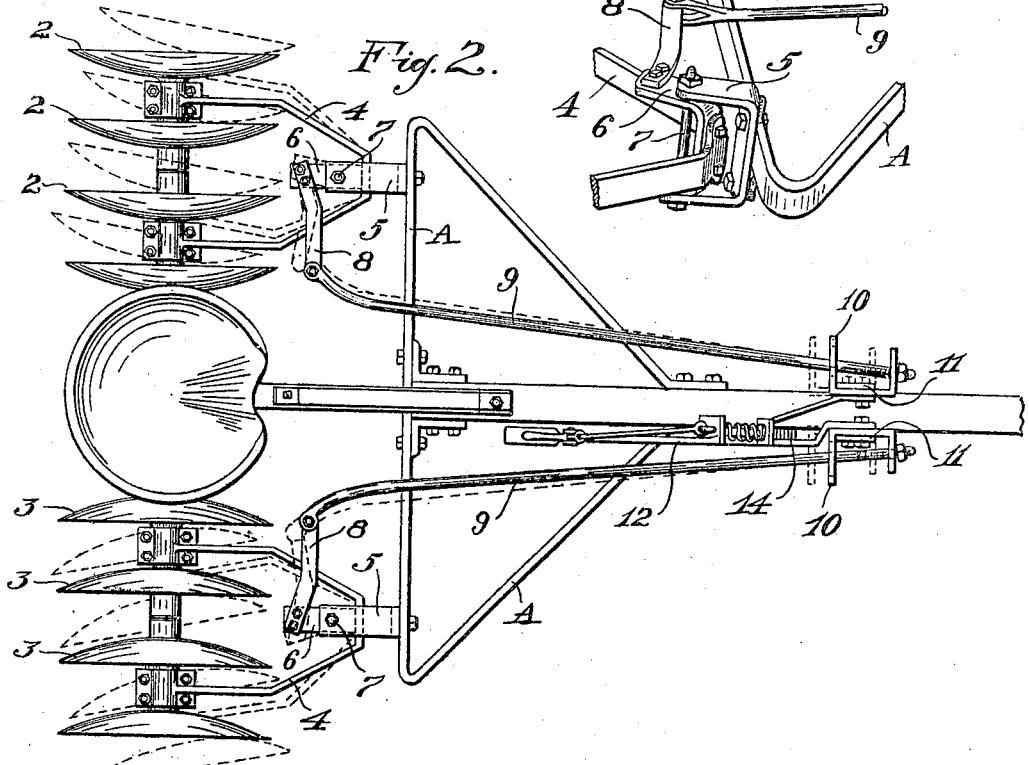
WITNESSES
INVENTOR
RALPH H. McCAUGHEY.
BY Geo. H. Strong.
HIS ATTORNEY.

UNITED STATES PATENT OFFICE.

RALPH H. McCAUGHEY, OF CAMPBELL, CALIFORNIA.

DISK-HARROW ADJUSTMENT.

952,341.  Specification of Letters Patent.  Patented Mar. 15, 1910.

Application filed November 25, 1908. Serial No. 464,433.

*To all whom it may concern:*

Be it known that I, RALPH H. Mc-CAUGHEY, citizen of the United States, residing at Campbell, in the county of Santa Clara and State of California, have invented new and useful Improvements in Disk-Harrow Adjustments, of which the following is a specification.

My invention relates to a means for adjusting disk or like harrows or plows to secure any angle of said disks with relation to the line of travel.

It consists in a swivel mounting and support for the disk-carrying frames, and connections whereby said frames and the disks may be turned with relation to the line of travel.

It also comprises details of construction which will be more fully explained by reference to the accompanying drawings, in which—

Figure 1 is a side elevation. Fig. 2 is a plan. Fig. 3 is a detail in perspective of the swivel mounting.

It is the object of my invention to provide a simple, easily operated device for changing the planes of disk harrows and the like with relation to the line of travel of the apparatus.

As shown in the drawings, A is the main frame having a pole to which the team may be attached, and 2 and 3 are disk sections independently mounted in supporting frames 4. The frames of these disk sections are connected with the main frame A by means of yokes or clevises 5 and 6. The clevis 5 in each case has its vertical portion firmly bolted to the straight rear portion of the main frame and near the end. Through the rearwardly projecting ends of this yoke extends a bolt 7, and this bolt forms a pivot which carries the inside yoke or clevis 6 which is turnable upon the bolt. This inside clevis is clamped or secured to the rear or disk frame, and the latter and the disks are thus capable of being swiveled about the vertical pivot bolt 7. One of these devices is represented at each end of the pole frame.

8 are lever arms bolted to the inner clevis or yoke extending therefrom toward the center, and connecting rods 9 are pivoted to the inner ends of these levers, and extend forwardly along the pole as shown. The front ends of these rods 9 pass through the ends of yokes 10, mounted upon a swinging lever 11, the ends of which project up, and each end carries one of these yokes. The bight of the lever 11 is pivoted and turnable, on pivot bolt 15, preferably beneath the pole as shown. By means of these yokes, the front ends of the connecting rods being screw-threaded, lock nuts are employed, and by the use of these nuts, a very accurate adjustment may be made in the length of the levers, and the consequent positions of the disks.

12 is a hand lever rigidly connected so as to turn the fulcrumed double lever 11, and thus through the connecting rods 9 and the lever arms 8 to swing the disks to one side or the other. The hand-lever may extend within reach of the operator on the seat of the machine, and a pawl 13 is adapted to engage with a segment rack 14 centered to 15 to hold the parts at any desired adjustment.

Having thus described my invention, what I claim and desire to secure by Letters Patent is—

1. The combination in a disk harrow adjusting device, of a main frame and pole, disk-carrying frames, vertical yokes fixed to the outer rear ends of the main frame, transversely movable clevises pivoted within said yokes, lever arms connected with the clevises and through the clevises with the disk-frames, and connecting rods and mechanism by which said rods are reciprocated to change the angle of the travel of the disks.

2. The combination in a disk harrow adjusting device, of a main frame having yokes bolted vertically to its rear outer ends, clevises pivoted within said yokes and turnable transversely, disk-carrying frames connected with the clevises and turnable transversely therewith, lever arms extending inwardly from the clevises, a rocking lever having yokes at its outer end, rods connecting the lever arms of the clevises with said last-named yokes, and means for adjusting the length of said rods.

3. The combination in a disk harrow adjusting device, of a main draft frame and pole, yokes fixed vertically at opposite sides of the rear end of said frame, clevises pivoted to swing transversely with relation to the yokes, disk-carrying frames with which the clevises are connected, lever arms extending inwardly from said clevises, connecting rods extending from the inner ends of the lever arms, a double rock lever pivoted to the pole, yokes and adjusting devices on said lever with which the rods are connected and a hand-lever and rack whereby the rock lever may be moved and the angle of the disks changed.

In testimony whereof I have hereunto set my hand in presence of two subscribing witnesses.

RALPH H. McCAUGHEY.

Witnesses:
   THOS. A. ROBINSON,
   GEO. WHITNEY.